United States Patent
Voorthuysen et al.

(10) Patent No.: US 7,922,384 B2
(45) Date of Patent: Apr. 12, 2011

(54) DEVICE FOR TRANSPORTING STICKY OR WET MATERIAL

(75) Inventors: Gerrit Van Voorthuysen, Bennebroek (NL); Raymond Newman, Toronto (CA)

(73) Assignee: M. Linc Inc. (CA)

( * ) Notice: Subject to any disclaimer, the term of this patent is extended or adjusted under 35 U.S.C. 154(b) by 608 days.

(21) Appl. No.: 11/852,745

(22) Filed: Sep. 10, 2007

(65) Prior Publication Data

US 2008/0067036 A1    Mar. 20, 2008

Related U.S. Application Data

(63) Continuation of application No. PCT/EP2006/050837, filed on Feb. 10, 2006.

(30) Foreign Application Priority Data

Mar. 11, 2005    (EP) .................................. 05101924

(51) Int. Cl.
*B65G 33/14*    (2006.01)

(52) U.S. Cl. ............... 366/320; 198/657; 198/673

(58) Field of Classification Search ............ 366/79, 366/310, 318, 320; 165/DIG. 77; 198/657, 198/672–675
See application file for complete search history.

(56) References Cited

U.S. PATENT DOCUMENTS

| | | | | |
|---|---|---|---|---|
| 2,009,734 A * | 7/1935 | Hiller et al. | ................. | 366/149 |
| 2,835,589 A * | 5/1958 | Whitefield | ................. | 426/520 |
| 2,836,401 A * | 5/1958 | Phelan | ................. | 366/311 |
| 2,847,197 A * | 8/1958 | Thompson | ................. | 366/311 |
| 3,845,856 A | 11/1974 | Hume | ................. | 198/213 |
| 3,999,921 A * | 12/1976 | Thor et al. | ................. | 425/208 |
| 4,232,973 A * | 11/1980 | Ligouzat | ................. | 366/156.2 |
| 4,383,764 A * | 5/1983 | Sloin | ................. | 366/75 |
| 4,900,158 A * | 2/1990 | Ugolini | ................. | 366/143 |
| 6,283,275 B1 | 9/2001 | Morris et al. | ................. | 198/677 |
| 6,745,818 B1 * | 6/2004 | Fan et al. | ................. | 164/113 |
| 2002/0104739 A1 | 8/2002 | Yoshikawa | ................. | 198/676 |

OTHER PUBLICATIONS

International Search Report, Apr. 11, 2006, 2 pages.

\* cited by examiner

*Primary Examiner* — David L Sorkin

(74) *Attorney, Agent, or Firm* — St. Onge Steward Johnston & Reens LLC

(57) ABSTRACT

The invention concerns a device for transporting sticky and/or wet material in horizontal direction comprising a shaftless spiral or screw having an outside diameter and an inside diameter, a stationary trough having a prismatic shape with at least at its underside a cylindrical part with a liner for supporting the outside diameter of the shaftless spiral or screw, and drive means for rotating the shaftless spiral or screw around a stationary straight centerline, the stationary trough having an inlet opening for receiving transportable material and at its underside an outlet opening for discharging transported material. According to the invention the shaftless spiral or screw is provided over its active length between the inlet opening and the outlet opening along the centreline with a pipe which is rotatable in the inside diameter of the shaftless spiral or screw.

11 Claims, 1 Drawing Sheet

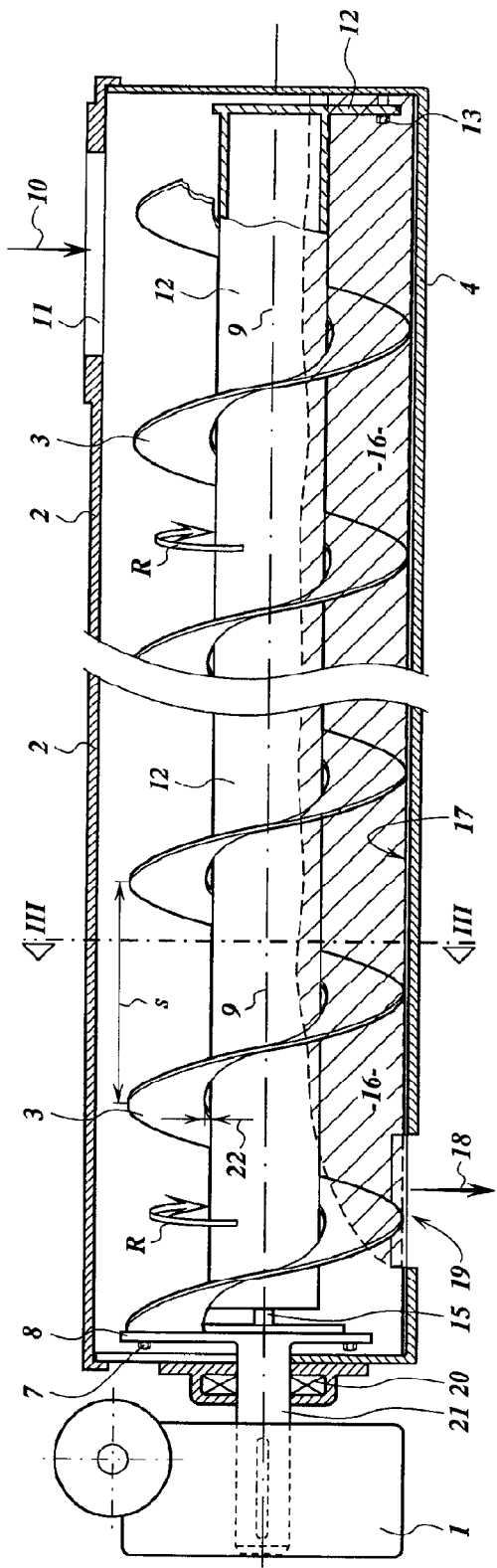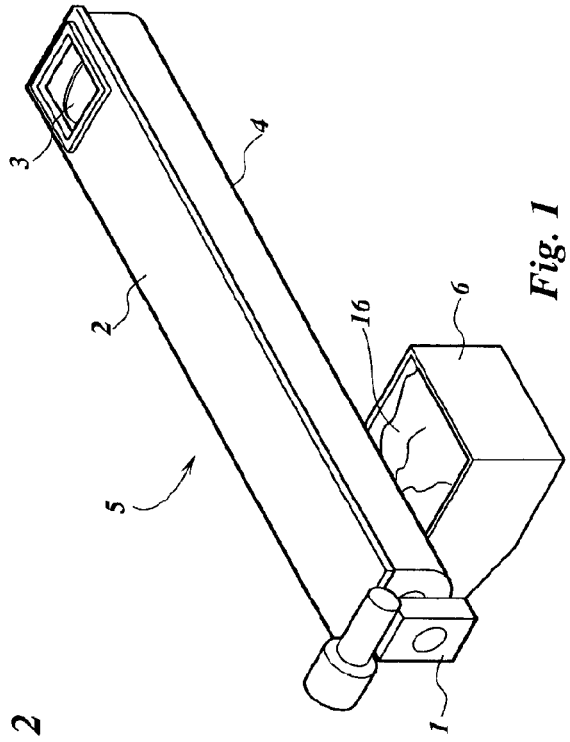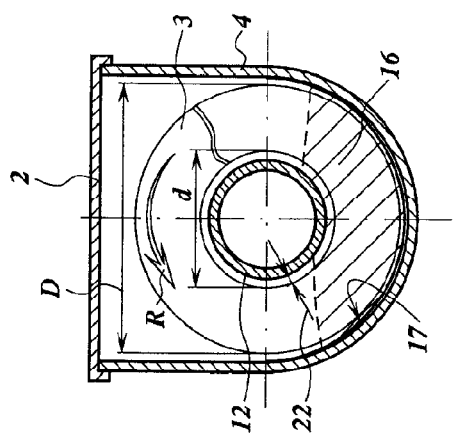

DEVICE FOR TRANSPORTING STICKY OR WET MATERIAL

CROSS-REFERENCE TO RELATED APPLICATIONS

The present application is a continuation of pending International patent application PCT/EP2006/050837, filed on Feb. 10, 2006, which designates the United States and claims priority from European patent application no. 05101924.8, filed Mar. 11, 2005, the content of which is incorporated herein by reference.

BACKGROUND OF THE INVENTION

The invention concerns a device for transporting sticky and/or wet material in a horizontal direction. Such devices are known and are often used for transporting sludge such as sewage sludge with a dry matter content of 20-30%. The known devices have the disadvantage that if the trough is filled to a too high level the sticky and/or wet material often moves back through the opening in the centre of the shaftless spiral or screw and so limits the capacity of the device.

SUMMARY OF THE INVENTION

In order to overcome this disadvantage the device is designed to comprise a shaftless spiral or screw having an outside diameter and an inside diameter, a stationary trough having a prismatic shape with at least at its underside a cylindrical part with a liner for supporting the outside diameter of the shaftless spiral or screw, and drive means for rotating the shaftless spiral or screw around a stationary straight centreline, the stationary trough having an inlet opening for receiving transportable material and at its underside an outlet opening for discharging transported material characterized in that the shaftless spiral or screw is provided over its active length between the inlet opening and the outlet opening along the centreline with a pipe which is rotatable in the inside diameter of the shaftless spiral or screw. By partly or whole closing the opening in the shaftless spiral or screw the trough can be filled to a higher level without the risk that when pushed forward by the spiral or screw the sticky and/or wet material over flows backwards through the opening in the centre of the shaftless spiral or screw.

According to a further improvement the device further includes a pipe with an outside diameter which is slightly smaller than the inside diameter of the shaftless spiral or screw. In this way all material transport through the opening in the centre of the shaftless spiral or screw is blocked.

According to a further improvement the device further includes a pipe is coupled to the stationary trough. In this way the pipe cannot rotate and the surface of the pipe is stationary just like the surface of the trough. This gives an additional resistance to the material and prevents moving of the material with the shaftless spiral or screw, thereby preventing rotating of the material. In this way the shaftless spiral or screw can move the material at a higher capacity or can move the material against an inclination.

According to a further improvement the device further includes along its length and above the underside the stationary trough has a mounting opening for sideways positioning the shaftless trough. In this way the stiff shaftless spiral or screw can be mounted in an easy way in the trough.

According to a further improvement the device further includes a drive means coupled to a shaft supported and aligned by the shaftless spiral or screw. In this way assembling of the device is easy as the shaft is in line with the outside diameter of the shaftless spiral or screw and needs no further bearings.

According to a further improvement the device further includes a centerline which makes an angle of up to 15-20 degrees with the horizontal plane. In this way the device can be used for transporting material upwards without need for additional equipment.

BRIEF DESCRIPTION OF THE DRAWINGS

The invention is illustrated with an embodiment by means of a drawing. In the drawing shows FIG. 1 a perspective view of a conveyor for transporting sludge, FIG. 2 a longitudinal section of the conveyor of FIG. 1, and FIG. 3 a cross section III-III of the conveyor of FIG. 2.

DETAILED DESCRIPTION OF THE INVENTION

FIGS. 1, 2 and 3 show a conveyor 5 for transporting sludge 16 from an inlet opening 11 to an outlet opening 19. The conveyor consists of a U-shaped trough 4 with end plates, whereby the underside of the trough 4 is cylindrical. On the inside of the trough 4 and at least at the underside a liner 17 is mounted over the length of the trough 4. The liner 17 is made of material that causes low friction resistance, such as HMWPE, polyurethane or hardened steel bars. The liner 17 supports a shaftless spiral 3. The shaftless spiral 3 has a pitch S, an outside diameter D and an inside diameter d. The pitch S is equal to the outer diameter D and the inside diameter d is approximately 0.5 D. The length of the shaftless spiral 3 can be considerable and is at least 5 to 10 times the outer diameter D. The shaftless spiral 3 is made from plate with sufficient thickness so that the pitch S is more or less constant under load conditions and the spiral 3 keeps it shape over the length. This results in a robust, more or less unbendable and stiff shaftless spiral 3 of which the outside circumference is made so that it is supported over its whole length by the liner 17. In the shown embodiment the trough 4 is U shaped. It will be clear that other shapes are possible, such as a pipe shaped trough, as long as the underside of the trough is cylindrical. In most situations the shaft ¯less spiral 3 and the trough 4 are made from steel, it is obvious for the skilled man that other materials can be used, such as aluminum, stainless steel and reinforced plastic materials.

At the drive side the shaftless spiral 3 ends in a flat plate that is coupled by bolts to a flange 8. The flange 8 is connected to a shaft 21 so that the shaft 21 has a centreline 9 in common with the shaftless spiral 3 and the liner 17. The shaft 21 is connected to a drive 1 which is mounted in such a way that it can rotate the shaft 21 and the shaftless spiral 3 in a direction of rotation R. For preventing material flow along the shaft 21 out of the trough 4 a gasket 20 is mounted round the shaft 21 and attached to an end plate of the trough 4. The position of the drive 1 can be at the end of the trough 4 near the inlet opening 11 or at the end near the outlet opening 19.

Inside the inner diameter d of the shaftless spiral 3 a pipe 12 is mounted, the diameter of the pipe 12 is such that it fits with a circular gap 22 inside the inner diameter d of the shaftless spiral 3. In this embodiment, the length of pipe 12 is such that it encompasses approximately the whole length of the shaftless spiral 3. Shorter pipes 12 are possible whereby axial positioning means for the pipe 12 are installed. The pipe 12 can be free floating inside the shaftless spiral 3. The means for limiting the movement of the pipe 12 in the longitudinal direction can comprise a buffer 15 at the side of the outlet opening 19. In some designs there are means for preventing rotation of the pipe 12, here shown as a lever 12, which is positioned between lugs 13 that are fastened to an end plate of the trough 4.

In order to make it possible that the shaftless spiral 3 can be mounted in an easy way the trough 4 is open at the top. To close the trough 4 the disclosed embodiment has a cover 2, for instance in order to prevent that sludge 16 in the trough 4 dries out during stand still of the shaftless spiral 3 or for safety reasons. The cover 2 has an inlet opening 11 through which an inflow 10 of sludge 16 can fall in a known way into the through 4. By rotating the shaftless spiral 3 in the direction of rotation R the sludge 16 slides over the circular underside of the through 4 to the outlet opening 19 and falls as an out ¬ flow 18 for instance in the container 6.

Generally the minimum value of the inflow 10 is chosen in combination with the speed of rotation of the shaftless spiral 3 in such a way that the average level of the sludge 16 remains under the top of the pipe 12. The pipe 12 thereby prevents that the sludge 16 moves through the opening in the inside diameter of the shaftless spiral 3, as occurs in designs without the pipe 12, and thereby makes a higher capacity of the conveyor 5 possible. This effect is obtained independently whether the pipe 12 rotates with the spiral 3 or not. In a design whereby the rotation of pipe 12 is prevented, the pipe 12 exerts friction on the sludge 16 in addition to the friction exerted by the liner 17. This added friction improves the working of the conveyor 5 by preventing rotating of the sludge 16 with the spiral 3. Such rotation of sludge would prevent transporting the sludge 16 in the longitudinal direction. The improvement by using the pipe 12 is especially important in situations where the through is filled to a high level with sludge 16 or where the conveyor 5 is used for transporting the sludge 16 upwards, for instance upwards under an angle of up to 15-20 degrees. Under special circumstances it is possible to transport the material under an angle of up to 90 degrees.

The disclosed embodiment of the conveyor 5 with the pipe 12 is suitable for many applications and is especially suitable for transporting wet materials such as sewage sludge with dry matter content 20-30%, sugar beets pulp, and organic waste that can be transported over long distances without the risk that the sludge 16 starts to rotate with the shaftless spiral 3.

It will be clear to the skilled man that the invention can be applied to conveyors with a shaftless spiral or screw of completely different dimensions and materials, whereby the pitch S and the inside diameter d in relation to the outside diameter D can be adapted to different circumstances, the specific length of the trough and material to be transported. Also there can be more than one inlet opening 11 or more than one outlet opening 19.

What is claimed is:

1. Device for transporting at least one of sticky and wet material in horizontal direction comprising a shaftless spiral or screw having an outside diameter and an inside diameter, a stationary trough having an inlet opening for receiving transportable material and at its underside an outlet opening for discharging transported material and drive means for rotating the shaftless spiral or screw around a stationary straight centreline, wherein the shaftless spiral or screw is provided over its active length between the inlet opening and the outlet opening along the centreline with a pipe in the inside diameter of the shaftless spiral or screw, wherein the stationary trough has a prismatic shape with along its length at least at its underside a cylindrical part with a liner that supports the outside diameter of the shaftless spiral or screw, characterized in that the pipe thereby prevents the transported material moving through an opening in the inside diameter of the shaftless spiral or screw.

2. Device according to claim 1 whereby the pipe is coupled to the stationary trough.

3. Device according to claim 2 whereby the pipe has an outside diameter which is slightly smaller than the inside diameter of the shaftless spiral or screw.

4. Device according to claim 2 whereby along its length and above the underside the stationary trough has a mounting opening for sideways positioning the shaftless spiral or screw in the trough.

5. Device according to claim 1 whereby the pipe has a lever which is positioned between lugs, said lugs are fastened to an end plate of the stationary trough.

6. Device for transporting at least one of sticky and wet material in horizontal direction comprising a shaftless spiral or screw having an outside diameter and an inside diameter, a stationary trough having an inlet opening for receiving transportable material and at its underside an outlet opening for discharging transported material and drive means for rotating the shaftless spiral or screw around a stationary straight centreline, wherein the shaftless spiral or screw is provided over its active length between the inlet opening and the outlet opening along the centreline with a pipe in the inside diameter of the shaftless spiral or screw, wherein the stationary trough has a prismatic shape with along its length at least at its underside a cylindrical part with a liner that supports the outside diameter of the shaftless spiral or screw, whereby the pipe is rotatable in the inside diameter of the shaftless spiral or screw.

7. Device according claim 6 whereby the pipe has an outside diameter which is slightly smaller than the inside diameter of the shaftless spiral or screw.

8. Device according to claim 7 whereby along its length and above the underside the stationary trough has a mounting opening for sideways positioning the shaftless spiral or screw in the trough.

9. Device according to claim 6 whereby along its length and above the underside the stationary trough has a mounting opening for sideways positioning the shaftless spiral or screw in the trough.

10. Device according to claim 6 whereby the drive means is coupled to a shaft supported and aligned by the shaftless spiral or screw.

11. Device according to claim 6 whereby the centreline makes an angle of up to 15-20 degrees with the horizontal plane.

\* \* \* \* \*